United States Patent
Morikawa

(10) Patent No.: US 10,882,246 B2
(45) Date of Patent: Jan. 5, 2021

(54) THREE-DIMENSIONAL SHAPED ARTICLE AND METHOD FOR PRODUCING THREE-DIMENSIONAL SHAPED ARTICLE

(71) Applicant: FUJI XEROX CO., LTD., Tokyo (JP)

(72) Inventor: Takashi Morikawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 179 days.

(21) Appl. No.: 16/132,632

(22) Filed: Sep. 17, 2018

(65) Prior Publication Data

US 2019/0111613 A1 Apr. 18, 2019

(30) Foreign Application Priority Data

Oct. 13, 2017 (JP) ................................ 2017-199108

(51) Int. Cl.
| | |
|---|---|
| *B29C 64/112* | (2017.01) |
| *B29C 64/10* | (2017.01) |
| *B33Y 80/00* | (2015.01) |
| *B29C 64/40* | (2017.01) |
| B29C 64/393 | (2017.01) |
| B29L 31/00 | (2006.01) |
| B33Y 10/00 | (2015.01) |
| B33Y 30/00 | (2015.01) |
| B33Y 50/02 | (2015.01) |
| B33Y 70/00 | (2020.01) |
| B29K 67/00 | (2006.01) |

(52) U.S. Cl.
CPC ............ *B29C 64/112* (2017.08); *B29C 64/40* (2017.08); *B29C 64/393* (2017.08); *B29K 2067/04* (2013.01); *B29K 2995/0092* (2013.01); *B29K 2995/0093* (2013.01); *B29L 2031/7532* (2013.01); *B33Y 10/00* (2014.12); *B33Y 30/00* (2014.12); *B33Y 50/02* (2014.12); *B33Y 70/00* (2014.12); *B33Y 80/00* (2014.12)

(58) Field of Classification Search
None
See application file for complete search history.

(56) References Cited

U.S. PATENT DOCUMENTS

| | | | | |
|---|---|---|---|---|
| 4,868,581 A | * | 9/1989 | Mouri | B41M 5/52 347/105 |
| 6,117,613 A | * | 9/2000 | Kawauchi | B41C 1/1008 430/270.1 |
| 6,143,464 A | * | 11/2000 | Kawauchi | B41C 1/1008 430/270.1 |
| 6,346,365 B1 | * | 2/2002 | Kawauchi | B41C 1/1008 430/270.1 |
| 6,579,596 B1 | * | 6/2003 | Akashi | C08J 7/16 427/301 |
| 8,359,118 B2 | | 1/2013 | Ono et al. | |
| 10,022,955 B2 | * | 7/2018 | Saito | B41J 2/01 |

(Continued)

FOREIGN PATENT DOCUMENTS

| | | |
|---|---|---|
| JP | 2009-273508 A | 11/2009 |
| JP | 2015-138192 A | 7/2015 |

(Continued)

*Primary Examiner* — Peter A Salamon
(74) *Attorney, Agent, or Firm* — Sughrue Mion, PLLC

(57) ABSTRACT

A three-dimensional shaped article has a sea-island structure including a cured object of a first shaping ink, which contains a hydrophobic resin, and a cured object of a second shaping ink, which contains a hydrophilic resin.

18 Claims, 4 Drawing Sheets

(56) References Cited

U.S. PATENT DOCUMENTS

| | | | |
|---|---|---|---|
| 2003/0118942 A1* | 6/2003 | Mitsumoto | B41C 1/1008 430/284.1 |
| 2003/0186163 A1* | 10/2003 | Endo | B41C 1/1008 430/270.1 |
| 2006/0216639 A1* | 9/2006 | Tashiro | B41C 1/1016 430/270.1 |
| 2007/0298195 A1* | 12/2007 | Nishimura | B41M 5/52 428/32.38 |
| 2008/0038491 A1* | 2/2008 | Ikeda | B41M 5/52 428/32.25 |
| 2008/0318018 A1* | 12/2008 | Segawa | G02B 5/201 428/220 |
| 2012/0003467 A1* | 1/2012 | Suzuki | B32B 33/00 428/336 |
| 2012/0249663 A1* | 10/2012 | Okumura | C09D 11/102 347/20 |
| 2013/0257034 A1* | 10/2013 | Shimohara | B42D 15/00 283/62 |
| 2014/0066538 A1* | 3/2014 | Sakamoto | C09D 11/322 522/16 |
| 2014/0323673 A1* | 10/2014 | Nakahama | C08F 212/08 526/329.5 |
| 2016/0246201 A1* | 8/2016 | Kobayashi | G03G 9/09314 |
| 2017/0008228 A1 | 1/2017 | Iwata et al. | |
| 2017/0036397 A1 | 2/2017 | Hashizume | |
| 2017/0239886 A1 | 8/2017 | Norikane | |
| 2019/0111613 A1* | 4/2019 | Morikawa | B29C 64/112 |

FOREIGN PATENT DOCUMENTS

| | | |
|---|---|---|
| JP | 2015-212071 A | 11/2015 |
| JP | 2017-24260 A | 2/2017 |

* cited by examiner

THREE-DIMENSIONAL SHAPED ARTICLE AND METHOD FOR PRODUCING THREE-DIMENSIONAL SHAPED ARTICLE

CROSS-REFERENCE TO RELATED APPLICATIONS

This application is based on and claims priority under 35 USC 119 from Japanese Patent Application No. 2017-199108 filed Oct. 13, 2017.

BACKGROUND

(i) Technical Field

The present invention relates to a three-dimensional shaped article and a method for producing a three-dimensional shaped article.

(ii) Related Art

A three-dimensional shaping apparatus is also called a "3D printer". An apparatus known as the three-dimensional shaping apparatus is, for example, one in which a three-dimensional shaping ink composition is arranged according to the cross-sectional shape data of a three-dimensional shape by using an inkjet method, and a three-dimensional shaped article (for example, a part such as an industrial product or the like, a toy such as a doll or the like) is produced by repeating curing with ultraviolet light or the like.

In recent years, there has been investigated the production of three-dimensional shaped articles of organs and the like by using a 3D printer according to three-dimensional data of human organs and the like for the purpose of use in the practice of surgical techniques, in prior examination before surgeries, etc.

SUMMARY

According to an aspect of the invention, there is provided a three-dimensional shaped article having a sea-island structure including a cured object of a first shaping ink, which contains a hydrophobic resin, and a cured object of a second shaping ink, which contains a hydrophilic resin.

BRIEF DESCRIPTION OF THE DRAWINGS

Exemplary embodiments of the present invention will be described in detail based on the following figures, wherein.

DETAILED DESCRIPTION

Figure 1:
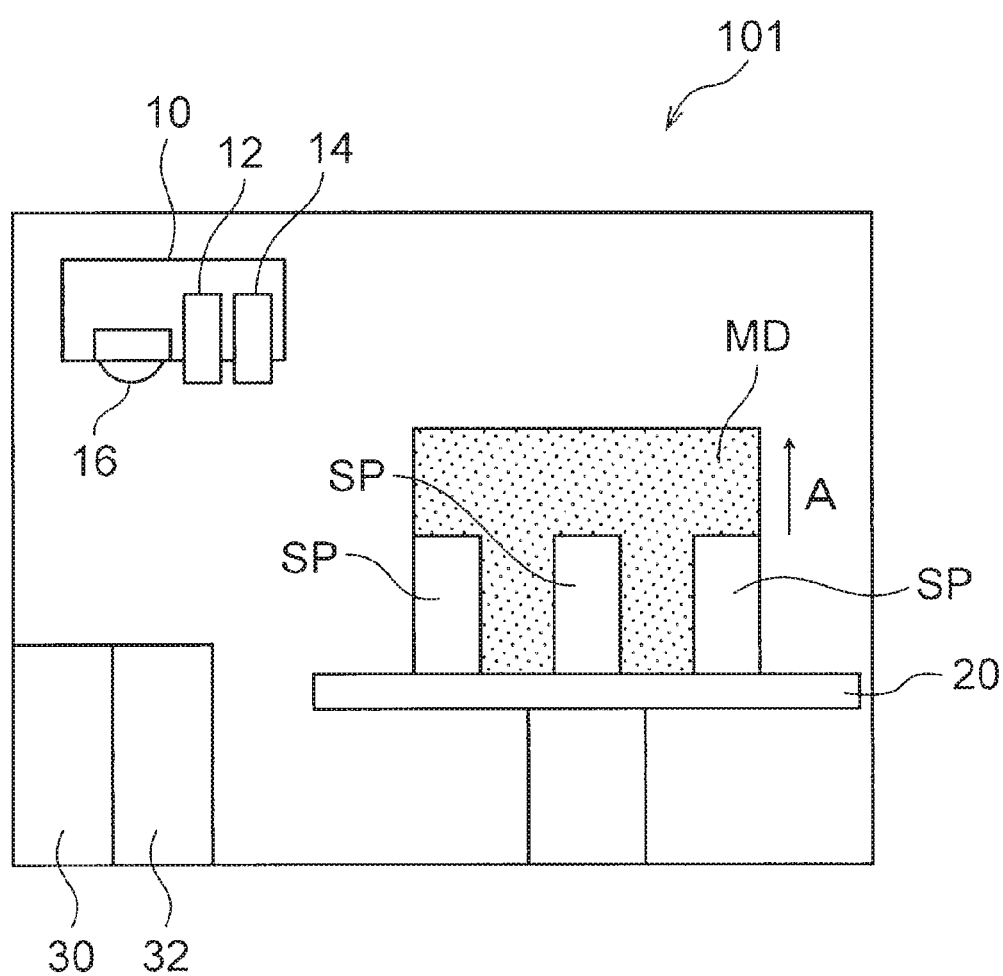
FIG. 1 is a schematic configuration diagram showing an example of a three-dimensional shaping apparatus according to an exemplary embodiment of the present invention.

Exemplary embodiments of the present invention are described below.

Members having substantially the same function are denoted by the same reference numeral over all drawings, and duplicate description may be appropriately omitted.

The term "(meth)acryl" is used based on the concept that it includes both "acryl" and "methacryl", and the term "(meth)acrylate" is used based on the concept that it includes both "acrylate" and "methacrylate".

(First Three-Dimensional Shaped Article)

A first form of a three-dimensional shaped article (also referred to as a "first three-dimensional shaped article") according to an exemplary embodiment of the present invention has a sea-island structure including a cured object of a first shaping ink, which contains a hydrophobic resin, and a cured object of a second shaping ink, which contains a hydrophilic resin.

In recent years, there has been investigated the production of three-dimensional shaped articles of organs and the like by using a 3D printer according to three-dimensional data of human organs and the like for the purpose of use in the practice of surgical techniques, in prior examination before surgeries, etc.

When a three-dimensional shaped article capable of realizing cutting with an electric knife used for surgeries and the like is produced as the three-dimensional shaped article of an organ or the like, practice, pre-examination, and the like can be done under conditions close to those of an actual surgery using an electric knife.

Japanese Laid Open Patent Application Publication No. 2009-273508 describes a method for producing a soft blood vessel model for surgical simulation. However, it is described that the model has high cutting tensile strength, and thus the model is considered to be difficult to cut with an electric knife.

Japanese Laid Open Patent Application Publication No. 2015-138192 discloses that a soft three-dimensional shaped article is produced by using a hydrogel configuration containing water in a polymer network structure-flow. However, it is described that the water contained in the three-dimensional shaped article is pure water or the like. Therefore, the three-dimensional shaped article has high volume resistivity and is thus considered to be unsuitable for, for example, cutting with an electric knife or the like.

Japanese Laid Open Patent Application Publication No. 2015-212071 discloses that a three-dimensional shaped article with adjusted hardness is produced by mixing dots of the cured objects of at least two types of photocurable inks different in hardness. However, the volume resistivity of the three-dimensional shaped article is not taken into consideration, and the three-dimensional shaped article is considered to be unsuitable for, for example, cutting with an electric knife or the like.

According to the first three-dimensional shaped article, it is possible to provide a three-dimensional shaped article used for forming, for example, a shaped article capable of realizing cutting even with an electric knife.

Specifically, for example, when the first three-dimensional shaped article is impregnated in an aqueous solution with conductivity, such as physiological saline or the like, the physiological saline enters a region including the cured object of the second shaping ink in the sea-island structure of the three-dimensional shaped article. Thus, it is considered that a region containing the physiological saline or the like is formed in the three-dimensional shaped article.

Also, when the region containing the physiological saline or the like is formed, the volume resistivity of the three-dimensional article can be brought close to the volume resistivity of a human organ or the like. Thus it is considered that cutting with an electric knife is realized.

Further, the softness of the three-dimensional shaped article having the region containing the physiological saline or the like becomes closer to that of a human organ or the like as compared with a three-dimensional shaped article formed by using only a resin. Therefore, it is considered that a three-dimensional shaped article suitable for cutting with an electric knife can be easily produced.

<Sea-Island Structure>

The first three-dimensional shaped article has the sea-island structure including the cured object of the first shaping ink, which contains a hydrophobic resin, and the cured object of the second shaping ink, which contains a hydrophilic resin.

The sea-island structure refers to a structure including a continuous region as a sea region and a noncontinuous region as an island region.

From the viewpoint of improving cuttability with an electric knife and producing a soft shaped article, the area ratio of the cured object of the second shaping ink relative to the total area of a section in a direction perpendicular to the lamination direction is preferably 20% by area or more and less than 50% by area, more preferably 25% by area or more and 45% by area or less, and still more preferably 30% by area or more and 40% by area or less.

The presence of the sea-island structure and the area ratio can be confirmed by observing, with a polarized light microscope, a section in a direction perpendicular to the lamination direction of the three-dimensional shaped article. The lamination direction of the three-dimensional shaped article can be estimated by, for example, observing a section of the three-dimensional shaped article. The lamination direction is measured by observing, with a microscope, a section formed by breaking a sample after cooling in liquid nitrogen, by cutting a sample piece, which is embedded with an epoxy resin, under a spectroscopic microscope or in a state of being mounted on a microtome body, or by a section milling method using an ion beam.

Also, the cured object of the second shaping ink preferably forms islands of the sea-island structure in a section in a direction perpendicular to the lamination direction.

When the cured object of the second shaping ink forms islands, the arithmetic average value of area of the islands in the section is preferably $1 \times 10^{-13}$ m$^2$ or more and less than $1 \times 10^{-12}$ m$^2$ and more preferably $3 \times 10^{-13}$ m$^2$ or more and $8 \times 10_{-13}$ m$^2$ or less.

The arithmetic average value of area of the islands is calculated as the arithmetic average value of area of 100 or more islands by observing the section in the method for confirming the sea-island structure described above.

When the cured object of the second shaping ink forms islands, the thickness of the islands in the section is preferably 0.5 μm or more and 30 μm or less and more preferably 1 μm or more and 20 μm or less.

The thickness of the islands refers to the maximum value of length in the lamination direction in the section.

Also, the width of the islands in the section is preferably 0.5 μm or more and 30 μm or less and more preferably 1 μm or more and 20 μm or less.

The width of the islands refers to the maximum value of length in a direction perpendicular to the lamination direction in the section.

In the first three-dimensional shaped article, at least a portion of the cured object of the second shaping ink preferably communicates with the outside.

When at least a portion of the cured object of the second shaping ink communicates with the outside, the three-dimensional shaped article containing physiological saline or the like can be easily produced by contact, from the outside, with an aqueous solution such as the physiological saline or the like.

In addition, the first three-dimensional shaped article may have a support part in addition to the region having the sea-island structure.

The support part is a region formed for supporting the shaped part during the production of the three-dimensional shaped article. Details thereof are described in the description of a method for producing the three-dimensional shaped article.

The support part may be a cured object of a support part forming-ink known in the 3D printer field, but preferably contains the cured object of the second shaping ink and is more preferably a region including the cured object of the second shaping ink.

The support part is preferably a region to be removed by an aqueous solution such as physiological saline or the like.

<Cured Object of Second Shaping Ink>

The cured object of the second shaping ink contains a hydrophilic resin.

The hydrophilic resin is, for example, a polymer produced by polymerizing a polymerizable compound contained in the second shaping ink described later. The hydrophilic resin is preferably a resin having a hydrophilic group such as a hydroxyl group, an amino group, a carboxy group, a phosphate group, a sulfonate group, an amide group, or the like, and is more preferably a resin having a hydroxyl group.

The hydrophilic resin preferably has a constituent unit formed of an acrylamide compound having a hydroxyl group and more preferably has a constituent unit formed of N-hydroxyethyl acrylamide.

Also, the cured object of the second shaping ink preferably contains, as a resin component, an ester compound of an unsaturated fatty acid having a hydroxyl group, more preferably contains a polyfunctional ester compound of an unsaturated fatty acid having a hydroxyl group and a polyfunctional alcohol, and still more preferably contains hydroxyl group-modified castor oil.

In addition, the hydrophilic resin used in the exemplary embodiment is preferably a water-soluble resin. In the exemplary embodiment, the "water-soluble" represents that the dissolved amount of an object material in 100 parts by mass of water at 25° C. is 0.1 parts by mass or more and is preferably 0.5 parts by mass or more.

The weight-average molecular weight of the hydrophilic resin is preferably 1,000 or more and 50,000 or less, more preferably 2,000 or more and 30,000 or less, and still more preferably 3,000 or more and 20,000 or less.

In the exemplary embodiment, the weight-average molecular weight of a resin component is a value measured by gel permeation chromatography (GPC) using polystyrene standard substances unless otherwise specified.

[Second Shaping Ink]

In the exemplary embodiment, the second shaping ink preferably contains a water-soluble monomer and a photopolymerization initiator and more preferably contains a water-soluble monomer, a photopolymerization initiator, an ester compound of an unsaturated fatty acid having a hydroxyl group, and a water-soluble compatibilizer.

Also, the second shaping ink according to the exemplary embodiment is preferably an ultraviolet curable ink.

A known support part-forming ink may be used as the second shaping ink, and an ultraviolet curable support part-forming ink is preferably used.

—Water-Soluble Monomer—

The second shaping ink according to the exemplary embodiment preferably contains a water-soluble monomer.

A preferred example of the water-soluble monomer is a water-soluble ethylenically unsaturated compound.

Also, the water-soluble monomer may be either a monofunctional monomer or a polyfunctional monomer, but is preferably a monofunctional monomer.

Examples of the water-soluble monomer include an unsaturated carboxylic acid compound, a (meth)acrylate compound having a hydroxyl group, and a (meth)acrylamide compound.

Examples of the unsaturated carboxylic acid compound include (meth)acrylic acid and the like.

Examples of the (meth)acrylate compound having a hydroxyl group include hydroxyethyl (meth)acrylate, hydroxypropyl (meth)acrylate, 4-hydroxybutyl (meth)acrylate, polyethylene glycol mono(meth)acrylate, methoxypolyethylene glycol mono(meth)acrylate, glycerin mono(meth)acrylate, polypropylene glycol mono(meth)acrylate, methoxypolypropylene glycol mono(meth)acrylate, mono(meth)acrylate of polyethylene glycol-polypropylene glycol block polymer, and the like.

Examples of the (meth)acrylamide compound include (meth)acrylamide, N-methyl (meth)acrylamide, N-ethyl (meth)acrylamide, N-propyl (meth)acrylamide, N-butyl (meth)acrylamide, N,N'-dimethyl (meth)acrylamide, N,N'-diethyl (meth)acrylamide, N-hydroxyethyl (meth)acrylamide, N-hydroxypropyl (meth)acrylamide, N-hydroxybutyl (meth)acrylamide, and the like.

The water-soluble monomer contained is preferably a monomer having a hydroxyl group from the viewpoint of ease of entering of an aqueous solution such as physiological saline or the like into the three-dimensional shaped article and from the viewpoint of inkjet ejection stability. The water-soluble monomer is more preferably at least one compound selected from the group consisting of a (meth)acrylate compound having a hydroxyl group and a (meth)acrylamide compound having a hydroxyl group, still more preferably a (meth)acrylamide compound having a hydroxyl group, and particularly preferably a hydroxyalkyl acrylamide compound.

From the viewpoint of ease of entering of an aqueous solution such as physiological saline or the like into the three-dimensional shaped article and from the viewpoint of inkjet ejection stability, the hydroxyalkyl acrylamide compound is preferably N-hydroxyethyl acrylamide, N-hydroxypropyl acrylamide, or N-hydroxybutyl acrylamide, and more preferably N-hydroxyethyl acrylamide.

Also, the second shaping ink preferably contains the monomer having a hydroxyl group as the water-soluble monomer in an amount of 50% by mass or more, more preferably 80% by mass or more, and particularly preferably 90% by mass or more relative to the total mass of the water-soluble monomer.

The second shaping ink may contain one or two or more water-soluble monomers.

From the viewpoint of ease of entering of an aqueous solution such as physiological saline or the like into the three-dimensional shaped article and from the viewpoint of inkjet ejection stability, the content of the water-soluble monomer in the second shaping ink is preferably 50% by mass or more and 95% by mass or less, more preferably 60% by mass or more and 92% by mass or less, and particularly preferably 70% by mass or more and 90% by mass or less relative to the total mass of the second shaping ink.

—Photopolymerization Initiator—

The second shaping ink preferably contains the photopolymerization initiator.

The photopolymerization initiator is preferably a photo-radical polymerization initiator.

Examples of the photo-radical polymerization initiator include aromatic ketones, acylphosphine oxide compounds, aromatic onium salt compounds, organic peroxides, thio compounds (a thioxanthone compound, a compound containing a thiophenyl group, and the like), hexaarylbiimidazole compounds, ketoxime ester compounds, borate compounds, azinium compounds, metallocene compounds, active ester compounds, compounds having a carbon-halogen bond, alkylamine compounds, and the like.

Specific examples of the photo-radical polymerization initiator include known photopolymerization initiators such as acetophenone, acetophenone benzyl ketal, 1-hydroxycyclohexyl phenyl ketone, 2,2-dimehtoxy-2-phenyl acetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethyl thioxanthone, 2-isopropyl thioxanthone, 2-chlorothioxanthone, 2-methyl-1-[4-(methylthio)phenyl]-2-morpholino-propan-1-one, bis(2,4,6-trimethylbenzoyl)-phenylphosphine oxide, 2,4,6-trimethylbenzoyl diphenyl phosphine oxide, 2,4-diethyl thioxanthone, bis(2,6-dimethoxybenzoyl)-2,4,4-trimethylpentyl phosphine oxide, and the like.

Among these, from the viewpoint of curability, aromatic ketones are preferred, and aromatic ketones and thioxanthone compounds are more preferred.

The second shaping ink may contain one or two or more photopolymerization initiators.

From the viewpoint of curability, the content of the photopolymerization initiator in the second shaping ink is preferably 1% by mass or more and 10% by mass or less and more preferably 3% by mass or more and 5% by mass or less relative to the total mass of the second shaping ink.

—Ester Compound of Unsaturated Fatty Acid Having Hydroxyl Group—

The second shaping ink preferably contains an ester compound of an unsaturated fatty acid having a hydroxyl group.

The ester compound of an unsaturated fatty acid having a hydroxyl group is preferably a polyfunctional ester compound of an unsaturated fatty acid having a hydroxyl group and a polyfunctional alcohol, and still more preferably hydroxyl group-modified castor oil.

Examples of the hydroxyl group-modified castor oil include modified castor oil produced by modifying castor oil with a polyhydric alcohol, modified castor oil fatty acid produced by modifying castor oil fatty acid (fatty acid obtained from castor oil) with a polyhydric alcohol, and the like.

Examples of the polyhydric alcohol include ethylene glycol, diethylene glycol, propylene glycol, dipropylene glycol, 1,4-butanediol, 1,3-butanediol, neopentyl glycol, 1,6-hexanediol, 1,2-hexanediol, 3-methl-1,5-pentanediol, 2-butyl-2-ethyl-1,3-propanediol, 2,4-diethyl-1,5-pentanediol, 1,8-octanediol, 1,9-nonanediol, 2-methyl-1,8-octanediol, 1,8-decanediol, octadecanediol, glycerin, trimethylolpropane, pentaerythritol, hexanetriol, and the like.

An alkyl ester compound of an unsaturated fatty acid having a hydroxyl group is also preferably used.

The alkyl ester compound of an unsaturated fatty acid having a hydroxyl group is preferably a C1 to C20 alkyl ester compound of an unsaturated fatty acid having a hydroxyl group, more preferably a C1 to C8 alkyl ester compound of an unsaturated fatty acid having a hydroxyl group, and still more preferably a methyl or ethyl ester compound of an unsaturated fatty acid having a hydroxyl group.

Also, the alkyl ester compound of an unsaturated fatty acid having a hydroxyl group is preferably an alkyl ester compound of at least one unsaturated fatty acid selected from the group consisting of ricinoleic acid, 10-hydroxy-cis-12-octadecenoic acid, oxooctadecanoic acid, 10-oxo-11-octadecenoic acid, ricinelaidic acid, and 10-hydroxy-octadecanoic acid, more preferably an alkyl ester compound of ricinoleic acid, still more preferably a C1 to C8 alkyl ester compound of ricinoleic acid, and particularly preferably a methyl or ethyl ester compound of ricinoleic acid.

Specific examples of the alkyl ester compound of an unsaturated fatty acid having a hydroxyl group include methyl ricinoleate, ethyl ricinoleate, n-propyl ricinoleate isopropyl ricinoleate, n-butyl ricinoleate, n-hexyl ricinoleate, n-octyl ricinoleate, methyl 10-hydroxy-cis-12-octadecenoate, ethyl 10-hydoxy-cis-12-octadecenoate, methyl oxo-octadecanoate, ethyl oxo-octadecanoate, methyl 10-oxo-11-octadecenoate, ethyl 10-oxo-11-octadecenoate, methyl ricinelaidate, ethyl ricinelaidate, methyl 10-hydroxy-octadecanoate, ethyl 10-hydroxy-octadecanoate, and the like.

The second shaping ink may contain one or two or more ester compounds of an unsaturated fatty acid having a hydroxyl group.

The content of the ester compound of an unsaturated fatty acid having a hydroxyl group in the second shaping ink is preferably 10% by mass or more and 60% by mass or less, more preferably 15% by mass or more and 55% by mass or less, and particularly preferably 20% by mass or more and 45% by mass or less relative to the total mass of the second shaping ink.

—Water-Soluble Compatibilizer—

The second shaping ink preferably contains the water-soluble compatibilizer.

The water-soluble compatibilizer is preferably a water-soluble compound not having an ethylenically unsaturated group, and may be a low-molecular compound having a molecular weight of less than 1,000 or a polymer having a molecular weight (weight-average molecular weight) of 1,000 or more.

From the viewpoint of inkjet ejection stability, the water-soluble compatibilizer is preferably a compound having a polyalkylene glycol structure and more preferably a compound having at least one structure selected from the group consisting of a polyethylene glycol structure and a polypropylene glycol structure.

Also, the water-soluble compatibilizer is preferably a compound having a hydrophilic group such as a hydroxyl group, an amino group, a carboxyl group, or the like, and more preferably a compound having a hydroxyl group.

The water-soluble compatibilizer is more preferably compound having one or two hydroxyl groups and particularly preferably a compound having a hydroxyl group.

From the viewpoint of inkjet ejection stability, the molecular weight of the water-soluble compatibilizer is preferably less than 1,000, more preferably 700 or less, still more preferably 500 or less, and particularly preferably 120 or more and 400 or less.

In particular, from the viewpoint of inkjet ejection stability, the water-soluble compatibilizer is preferably a polyalkylene glycol monoalkyl ether compound and more preferably a di- or tri-alkylene glycol monoalkyl ether compound.

From the viewpoint of inkjet ejection stability, the monoalkyl ether of the polyalkylene glycol monoalkyl ether compound is preferably a monoalkyl ether having 1 to 8 carbon atoms and more preferably a monoalkyl ether having 1 to 4 carbon atoms.

Also, from the viewpoint of inkjet ejection stability, the polyalkylene glycol of the polyalkylene glycol monoalkyl ether compound is preferably polyethylene glycol or polypropylene glycol and more preferably polyethylene glycol.

From the viewpoint of inkjet ejection stability, the number of repetitions of an alkyleneoxy structure of the polyalkylene glycol in the polyalkylene glycol monoalkyl ether compound is preferably 2 or more and 10 or less, more preferably 2 or more and 6 or less, still more preferably 2 or more and 4 or less, and particularly preferably 2 or 3.

Specific examples of the water-soluble compatibilizer include triethylene glycol monomethyl ether, diethylene glycol monobutyl ether, tripropylene glycol monomethyl ether, propylene glycol, diethylene glycol monoisobutyl ether, diethylene glycol monomethyl ether, diethylene glycol monoisopropylene ether, triethylene glycol monobutyl ether, diethylene glycol monobenzoyl ether, triethylene glycol dimethyl ether, diethylene glycol dibutyl ether, and the like.

The second shaping ink may contain one or two or more water-soluble compatibilizers.

From the viewpoint of inkjet ejection stability, the content of the water-soluble compatibilizer in the second shaping ink is preferably 10% by mass or more and 45% by mass or less, more preferably 15% by mass or more and 40% by mass or less, and particularly preferably 20% by mass or more and 35% by mass or less relative to the total mass of the second shaping ink.

—Surfactant—

From the viewpoint of inkjet ejection stability, the second shaping ink preferably contains the surfactant.

Examples of the surfactant include known surfactants such as a silicone-based surfactant, an acrylic surfactant, a cationic surfactant, an anionic surfactant, a nonionic surfactant, an amphoteric surfactant, a fluorine-based surfactant, and the like.

The second shaping ink may contain one or two or more surfactants.

From the viewpoint of inkjet ejection stability, the content of the surfactant in the second shaping ink is preferably 0.05% by mass or more and 2% by mass or less and more preferably 0.1% by mass or more and 1% by mass or less relative to the total mass of the second shaping ink.

—Polymerization Inhibitor—

From the viewpoint of inkjet ejection stability, the second shaping ink preferably contains a polymerization inhibitor.

Examples of the polymerization inhibitor include known polymerization inhibitors such as phenolic polymerization inhibitors (for example, p-methoxyphenol, cresol, tert-butylcatechol, 3,5-di-tert-butyl-4-hydroxytoluene, 2,2'-methylene bis(4-methyl-6-tert-butylphenol), 2,2'-methylene bis(4-ethyl-6-butylphenol), 4,4'-thiobis(3-methyl-6-tert-butylphenol, and the like), hindered amine, hydroquinone monomethyl ether (MEHQ), hydroquinone, and the like.

The second shaping ink may contain one or two or more polymerization inhibitors.

From the viewpoint of inkjet ejection stability, the content of the polymerization inhibitor in the second shaping ink is preferably 0.1% by mass or more and 1% by mass or less and more preferably 0.2% by mass or more and 0.8% by mass or less relative to the total mass of the second shaping ink.

—Other Additives—

The second shaping ink may further contain other additives. Known additives can be used as the other additives, and examples thereof include a coloring agent, a solvent, a sensitizer, a fixing agent, an anti-mold agent, an antiseptic agent, an antioxidant, an ultraviolet absorber, a chelating agent, a thickener, a dispersant, a polymerization accelerator, a penetration accelerator, a wetting agent (moisturizing agent), and the like.

—Characteristics of Second Shaping Ink—

The surface tension of the second shaping ink is preferably within a range of 20 mN/m or more and 40 mN/m or less.

The surface tension of each of the second shaping ink and the first shaping ink described later is a value measured by using a Wilhelmy surface tension balance (manufactured by Kyowa Interface Science Co., Ltd.) in an environment of 23° C. and 55% RH.

The viscosity of the second shaping ink is preferably within a range of 30 mPa·s or more and 50 mPa·s or less.

The viscosity of each of the second shaping ink and the first shaping ink described later is a value measured by using RHEOMAT 115 (manufactured by Contraves) as a measuring device under the conditions including a measurement temperature of 23° C. and a shear rate of 1,400 s$^{-1}$.

<Cured Object of First Shaping Ink>

The cured object of the first shaping ink contains a hydrophobic resin.

Examples of the hydrophobic resin include, but are not limited to, addition-polymerizable resins such as an acrylic resin, a styrene-acrylic resin, and the like.

Also, the hydrophobic resin used in the exemplary embodiment is preferably a water-insoluble resin. In the exemplary embodiment, the term "water-insoluble" represents that the dissolved amount of an object material in 100 parts by mass of water at 25° C. is less than 0.1 parts by mass and preferably less than 0.05 parts by mass.

The weight-average molecular weight of the hydrophobic resin is preferably 1,000 or more and 100,000 or less, more preferably 2,000 or more and 80,000 or less, and still more preferably 3,000 or more and 50,000 or less.

[First Shaping Ink]

The first shaping ink may be a one-component curing type or a two-component curing type, but is preferably a radical-polymerizable shaping ink, more preferably contains a polymerizable compound, and particularly preferably contains a polymerizable compound and a photopolymerization initiator.

Further, the first shaping ink may contain other additives such as a polymerization inhibitor, a surfactant, etc.

A known ink for producing a three-dimensional shaped article may be used as the first shaping ink.

—Polymerizable Compound—

The polymerizable compound used in the first shaping ink is not particularly limited but is preferably an ethylenically unsaturated compound.

The ethylenically unsaturated compound is not particularly limited as long as it is a compound having an ethylenically unsaturated bond, and may be a monofunctional ethylenically unsaturated compound or a polyfunctional ethylenically unsaturated compound.

In particular, the first shaping ink preferably contains urethane (meth)acrylate as the ethylenically unsaturated compound.

—Urethane (Meth)Acrylate—

The urethane (meth)acrylate is a compound having a urethane structure and two or more (meth)acryloyl groups in one molecule. The urethane (meth)acrylate may be a monomer or an oligomer, but is preferably an oligomer.

In the specification of the present invention, "(meth)acrylate" represents both acrylate and methacrylate. Also, "(meth)acryloyl" represents both an acryloyl group and a methacryloyl group.

The number of functional groups (number of (meth)acryloyl groups) of the urethane (meth)acrylate is 2 or more and 20 or less (preferably 2 or more and 15 or less).

The urethane (meth)acrylate is, for example, a reaction product using a polyisocyanate compound, a polyol compound, and a hydroxyl group-containing (meth)acrylate. Specifically, the urethane (meth)acrylate is, for example, a reaction product of a prepolymer, which is produced by reacting a polyisocyanate compound with a polyol compound and which has an isocyanate group at an end thereof, and a hydroxyl group-containing (meth)acrylate. Also, the urethane (meth)acrylate is, for example, a reaction product of a polyisocyanate compound and a hydroxyl group-containing (meth)acrylate.

Polyisocyanate Compound

Examples of the polyisocyanate compound include a chain saturated hydrocarbon isocyanate, a cyclic saturated hydrocarbon isocyanate, an aromatic polyisocyanate, and the like. Among these, the polyisocyanate compound is preferably a chain saturated hydrocarbon isocyanate not having a light absorption band in the near-ultraviolet region or a cyclic saturated hydrocarbon isocyanate not having a light absorption band in the near-ultraviolet region.

Examples of the chain saturated hydrocarbon isocyanate include tetramethylene diisocyanate, hexamethylene diisocyanate, 2,2,4-trimethylhexamethylene diisocyanate, 2,4,4-trimethylhexamethylene diisocyanate, and the like.

Examples of the cyclic saturated hydrocarbon isocyanate include isophorone diisocyanate, norbornane diisocyanate, dicyclohexylmethane diisocyanate, methylene bis(4-cyclohexylisocyanate), hydrogenated diphenylmethane diisocyanate, hydrogenated xylene diisocyanate, hydrogenated toluene diisocyanate, and the like.

Examples of the aromatic polyisocyanate include 2,4-tolylene diisocyanate, 1,3-xylylene diisocyanate, p-phenylene diisocyanate, 3,3'-dimethyl-4,4'-diisocyanate, 6-isopropyl-1,3-phenyl diisocyanate, 1,5-naphthalene diisocyanate, and the like.

Polyol Compound

Examples of the polyol compound include a diol, a polyhydric alcohol, and the like.

Examples of the diol include alkylene glycols (for example, ethylene glycol, 1,2-propanediol, 1,3-propanediol, 2-methyl-1,3-propanediol, 1,3-butanediol, 1,4-butanediol, 1,5-pentanediol, 2-methyl-1,5-pentanediol, neopentyl glycol, 3-methyl-1,5-pentanediol, 2,3,5-trimethyl-1,5-pentanediol, 1,6-hexanediol, 2-ethyl-1,6-hexanediol, 2,2,4-trimethyl-1,6-hexanediol, 1,8-octanediol, 1,9-nonanediol, 1,10-decanediol, 1,12-dodecanediol, 1,14-tetradecanediol, 1,16-hexadecanediol, 1,2-dimethylolcyclohexane, 1,3-dimethylolcyclohexane, 1,4-dimethylolcyclohexane, and the like), and the like.

Examples of the polyhydric alcohol include alkylene polyhydric alcohols having three or more hydroxyl groups (for example, glycerin, trimethylolethane, trimethylolpropane, 1,2,6-hexanetriol, 1,2,4-butanetriol, erythritol, sorbitol, pentaerythritol, dipentaerythritol, mannitol, and the like.

Other examples of the polyol compound include polyether polyol, polyester polyol, polycarbonate polyol, and the like.

Examples of the polyether polyol include a polyhydric alcohol oligomer, a polyhydric alcohol alkylene oxide adduct, an alkylene oxide ring-opened polymer, and the like.

In this case, examples of the polyhydric alcohol include ethylene glycol, diethylene glycol, propylene glycol, dipropylene glycol, 1,4-butanediol, 1,3-butanediol, neopentyl glycol, 1,6-hexanediol, 1,2-hexanediol, 3-methyl-1,5-pentanediol, 2-butyl-2-ethyl-1,3-propanediol, 2,4-diethyl-1,5-pentanediol, 1,8-octanediol, 1,9-nonanediol, 2-methyl-1,8-octanediol, 1,8-decanediol, octadecanediol, glycerin, trimethylolpropane, pentaerythritol, hexanetriol, and the like.

Examples of the alkylene oxide include ethylene oxide, propylene oxide, butylene oxide, styrene oxide, epichlorohydrin, tetrahydrofuran, and the like.

Examples of the polyester polyol include a reaction product of a polyhydric alcohol and a dibasic acid, a cyclic ester compound ring-opened polymer, and the like.

In this case, examples of the polyhydric alcohol include the same polyhydric alcohols as the examples described for the polyether polyol.

Examples of the dibasic acid include carboxylic acids (for example, succinic acid, adipic acid, sebacic acid, dimer acid, maleic acid, phthalic acid, isophthalic acid, terephthalic acid, and the like), carboxylic acid anhydrides and the like.

Examples of the cyclic ester compound include ε-caprolactone, β-methyl-δ-valerolactone, and the like.

Examples of the polycarbonate polyol include the reaction product of glycol and alkylene carbonate, the reaction product of glycol and diaryl carbonate, the reaction product of glycol and dialkyl carbonate, and the like.

In this case, examples of the alkylene carbonate include ethylene carbonate, 1,2-propylene carbonate, 1,2-butylene carbonate, and the like. Examples of the diaryl carbonate include diphenyl carbonate, 4-methyldiphenyl carbonate, 4-ethyldiphenyl carbonate, 4-propylenediphenyl carbonate, 4,4'-dimethyldiphenyl carbonate, 2-tolyl-4-tolyl carbonate, 4,4'-diethyldiphenyl carbonate, 4,4'-dipropyldiphenyl carbonate, phenyltoluyl carbonate, bischlorophenyl carbonate, phenylchlorophenyl carbonate, phenylnaphthyl carbonate, dinaphthyl carbonate, and the like.

Examples of the dialkyl carbonate include dimethyl carbonate, diethyl carbonate, di-n-propyl carbonate, diisopropyl carbonate, di-n-butyl carbonate, diisobutyl carbonate, di-tert-butyl carbonate, di-n-amyl carbonate, diisoamyl carbonate, and the like.

Hydroxyl Group-Containing (Meth)Acrylate

Examples of the hydroxyl group-containing (meth)acrylate include 2-hydroxyethyl (meth)acrylate, 2-hydroxypropyl (meth)acrylate, 2-hydroxybutyl (meth)acrylate, 2-hydroxy-3-phenoxypropyl (meth)acrylate, glycerin di(meth)acrylate, trimethylolpropane di(meth)acrylate, pentaerythritol tri(meth)acrylate, dipentaerythritol penta(meth)acrylate, and the like. Other examples of the hydroxyl group-containing (meth)acrylate include (meth)acrylic acid adducts of glycidyl group-containing compounds (for example, alkyl glycidyl ether, ally glycidyl ether, glycidyl (meth)acrylate, and the like).

—Weight-Average Molecular Weight of Urethane (Meth)Acrylate—

The weight-average molecular weight of the urethane (meth)acrylate is preferably 500 or more and 5,000 or less and more preferably 1,000 or more and 3,000 or less.

The weight-average molecular weight of the urethane (meth)acrylate is a value measured by gel permeation chromatography (GPC) using polystyrene standard substances.

—Other Ethylenically Unsaturated Compound—

The other ethylenically unsaturated compound is, for example, an ethylenically unsaturated compound having at least one group selected from the group consisting of an N-vinyl group, a vinyl ether group, and a (meth)acryloyl group.

Specific examples of the other ethylenically unsaturated compound include (meth)acrylates (monofunctional (meth)acrylates and polyfunctional (meth)acrylates) and the like.

Examples of the monofunctional (meth)acrylates include a linear, branched, or cyclic alkyl (meth)acrylate, a (meth)acrylate having a hydroxyl group, a (meth)acrylate having a hetero ring, a (meth)acrylamide compound, and the like.

Examples of the alkyl (meth)acrylate include methyl (meth)acrylate, ethyl (meth)acrylate, isobutyl (meth)acrylate, tert-butyl (meth)acrylate, lauryl (meth)acrylate, stearyl (meth)acrylate, isostearyl (meth)acrylate, cyclohexyl (meth)acrylate, 4-tert-cyclohexyl (meth)acrylate, isobornyl (meth)acrylate, dicyclopentanyl (meth)acrylate, and the like.

Examples of the (meth)acrylate having a hydroxyl group include hydroxyethyl (meth)acrylate, hydroxypropyl (meth)acrylate, 4-hydroxybutyl (meth)acrylate, polyethylene glycol mono(meth)acrylate, methoxypolyethylene glycol mono(meth)acrylate, polypropylene glycol mono(meth)acrylate, methoxypolypropylene glycol mono(meth)acrylate, polyethylene glycol-polypropylene glycol block polymer mono(meth)acrylate, and the like.

Examples of the (meth)acrylate having a hetero ring include tetrahydrofurfuryl (meth)acrylate, 4-(meth)acryloyloxymethyl-2-methyl-2-ethyl-1,3-dioxolane, 4-(meth)acryloyloxymethyl-2-cyclohexyl-1,3-dioxolane, adamantly (meth)acrylate, and the like.

Examples of the (meth)acrylamide compound include (meth)acrylamide, N-methyl (meth)acrylamide, N-ethyl (meth)acrylamide, N-propyl (meth)acrylamide, N-butyl (meth)acrylamide, N,N'-dimethyl (meth)acrylamide, N,N'-diethyl (meth)acrylamide, N-hydroxyethyl (meth)acrylamide, N-hydroxypropyl (meth)acrylamide, N-hydroxybutyl (meth)acrylamide, and the like.

Examples of a difunctional (meth)acrylate among the polyfunctional (meth)acrylates include 1,10-decanediol diacrylate, 2-methyl-1,8-octanediol diacrylate, 2-butyl-2-ethyl-1,3-propanediol diacrylate, 1,9-nonanediol diacrylate, 1,8-octanediol diacrylate, 1,7-heptanediol diacrylate, polytetramethylene glycol diacrylate, 3-methyl-1,5-pentanediol diacrylate, 1,6-hexanediol diacrylate, neopentyl glycol diacrylate, hydroxypivalic acid neopentyl glycol diacrylate, tripropylene glycol diacrylate, 1,4-butanediol diacrylate, dipropylene glycol diacrylate, 2-(2-vinyloxyethoxy) ethyl acrylate, EO (ethylene oxide)-modified bisphenol A diacrylate, PO (propylene oxide)-modified bisphenol A diacrylate, EO-modified hydrogenated bisphenol A diacrylate, EO (ethylene oxide)-modified bisphenol F diacrylate, and the like.

Examples of a tri- or higher-functional (meth)acrylate among the polyfunctional (meth)acrylates include trimethylolpropane triacrylate, ethoxylated trimethylolpropane triacrylate, propoxylated trimethylolpropane triacrylate, pentaerythritol triacrylate, ethoxylated glycerin triacrylate, tetramethylolmethane triacrylate, pentaerythritol tetraacrylate, ethoxylated pentaerythritol tetraacrylate, EO (ethylene oxide)-modified diglycerin tetraacrylate, ditrimethylolpropane tetraacrylate-modified acrylate, dipentaerythritol pentaacrylate, dipentaerythritol hexaacrylate, and the like.

The content of the polymerizable compound is preferably 90% by mass or more and 99% by mass or less and more preferably 93% by mass or more and 97% by mass or less relative to the total mass of the first shaping ink.

In particular, the urethane (meth)acrylate and the other ethylenically unsaturated compound are preferably used in combination as the polymerizable compound. In this case, the content of the urethane (meth)acrylate is preferably 10% by mass or more and 60% by mass or less and more preferably 20% by mass or more and 50% by mass or less relative to the total mass of the first shaping ink. On the other hand, the content of the other ethylenically unsaturated compound is preferably 40% by mass or more and 75% by mass or less and more preferably 50% by mass or more and 65% by mass or less relative to the total mass of the first shaping ink.

These polymerizable compounds may be used alone or in combination of two or more.

—Photopolymerization Initiator—

The photopolymerization initiator is preferably a photoradical polymerization initiator.

Preferred examples of the photopolymerization initiator include those described above.

The content of the photopolymerization initiator is preferably, for example, 1% by mass or more and 10% by mass or less and more preferably 3% by mass or more and 5% by mass or less relative to the total mass of the first shaping ink.

The photopolymerization initiators may be used alone or in combination of two or more.

—Polymerization Inhibitor—

Preferred examples of the polymerization inhibitor include those described above.

The content of the polymerization inhibitor is preferably, for example, 0.1% by mass or more and 1% by mass or less and more preferably 0.3% by mass or more and 0.5% by mass or less relative to the total mass of the first shaping ink.

These polymerization inhibitors may be used alone or in combination of two or more.

—Surfactant—

Preferred examples of the surfactant include those described above.

The content of the surfactant is preferably, for example, 0.05% by mass or more and 0.5% by mass or less and more preferably 0.1% by mass or more and 0.3% by mass or less relative to the total mass of the first shaping ink.

The surfactants may be used alone or in combination of two or more.

—Other Additives—

Besides the above, examples of other additives include known additives such as a coloring agent, a solvent, a sensitizer, a fixing agent, an anti-mold agent, an antiseptic agent, an antioxidant, an ultraviolet absorber, a chelating agent, a thickener, a dispersant, a polymerization accelerator, a penetration accelerator, a wetting agent (moisturizing agent), and the like.

—Characteristics of First Shaping Ink—

The surface tension of the first shaping ink is preferably within a range of 20 mN/m or more and 40 mN/m or less.

The viscosity of the first shaping ink is preferably within a range of 30 mPa·s or more and 50 mPa·s or less.

(Second Three-Dimensional Shaped Article)

A second three-dimensional shaped article according to an exemplary embodiment of the present invention has a sea-island structure including a cured object of the first shaping ink, which contains a hydrophobic resin, and a region containing physiological saline.

The second three-dimensional shaped article is produced by, for example, bringing the first three-dimensional shaped article into contact with physiological saline to allow the physiological saline to enter the region including the cured object of the second shaping ink in the first three-dimensional shaped article.

The second three-dimensional shaped article having the sea-island structure including the region containing physiological saline is considered to be capable of realizing cutting with an electric knife.

The region containing physiological saline in the second three-dimensional shaped article may further contain a component such as the hydrophilic resin or the like contained in the cured object of the second shaping ink.

For example, the first three-dimensional shaped article is brought into contact with physiological saline, thereby allowing physiological saline to enter the region including the cured object of the second shaping ink. Thus, the component such as the hydrophilic resin or the like contained in the cured object of the second shaping ink is considered to be washed away, but it may remain without being completely washed away.

For example, from the viewpoint of cutting with an electric knife, the volume resistivity of the second three-dimensional shaped article at 25° C. is preferably 400 Ω·cm or more and 10000 Ω·cm or less and more preferably 500 Ω·cm or more and 1000 Ω·cm or less. The volume resistivity is measured by a resistivity meter (for example, LORESTA GX MCP-T700 manufactured by Mitsubishi Chemical Analytech Co., Ltd.).

Also, the second three-dimensional shaped article may contain both a region having a high content of the first shaping ink and high volume resistivity and a region having a high content of a region containing physiological saline and low volume resistivity. The volume resistivity of at least a region subjected to cutting with an electric knife is preferably within the range described above.

The area ratio of the region containing physiological saline relative to the total area of a section in a direction perpendicular to the lamination direction is preferably 10% by area or more and 60% by area or less and more preferably 30% by area or more and 50% by area or less.

Also, the region containing physiological saline preferably forms islands of the sea-island structure in a section in a direction perpendicular to the lamination direction.

When the region containing physiological saline forms islands, the arithmetic average value of area of the islands in the section is preferably $1 \times 10^{-13}$ $m^2$ or more and $1 \times 10^{-12}$ $m^2$ or less and more preferably $3 \times 10^{-13}$ $m^2$ or more and $8 \times 10^{-13}$ $m^2$ or less.

The arithmetic average value of area of the islands is calculated as the arithmetic average value of area of 100 or more islands by observing the section in the method for confirming the sea-island structure described above.

When the region containing physiological saline forms islands, the thickness of the islands in the section is preferably 0.1 μm or more and 8 μm or less and more preferably 0.5 μm or more and 5 μm or less.

Also, the width of the islands in the section is preferably 1 μm or more and 10 μm or less and more preferably 2 μm or more and 8 μm or less.

The JIS-A hardness of the second three-dimensional shaped article is preferably 10° or more and 30° or less and more preferably 15° or more and 27° or less.

The JIS-A hardness is measured according to JIS K 6253 (2012) using durometer type A (manufactured by Teclock Co., Ltd.).

Also, the second three-dimensional shaped article may contain both a hard region having a high content of the first shaping ink and a soft region having a high content of a region containing physiological saline. The JIS-A hardness of at least a region subjected to cutting with an electric knife is preferably within the range described above.

Details of the cured object of the first shaping ink in the second three-dimensional shaped article are the same as those of the cured object of the first shaping ink in the first three-dimensional shaped article.

Also, details of the region containing physiological saline in the second three-dimensional shaped article are the same as those of a region formed by replacing the cured object of the second shaping ink in the first three-dimensional shaped article with physiological saline.

(Method for Producing Three-Dimensional Shaped Article)

A method for producing the three-dimensional shaped article according to the present disclosure includes shaping to form a shaped part by ejecting the first shaping ink containing a precursor of the hydrophobic resin and the second shaping ink containing a precursor of the hydrophilic resin so that the content of the second shaping ink is 10% by mass or more and 40% by mass or less relative to the total mass of the shaped part.

<Shaping>

In the shaping, the shaped part is formed by ejecting the first shaping ink containing a precursor of the hydrophobic resin and the second shaping ink containing a precursor of the hydrophilic resin so that the content of the second shaping ink is 20% by mass or more and less than 50% by mass or less relative to the total mass of the shaped part.

That is, the content of the second shaping ink in the shaped part is 20% by mass or more and less than 50% by mass.

The content of the second shaping ink is 20% by mass or more and 50% by mass or less, preferably 25% by mass or more and 45% by mass or less, and more preferably 30% by mass or more and 40% by mass or less.

The second shaping ink is preferably ejected so that the cured object of the first shaping ink and the cured object of the second shaping ink form the sea-island structure.

Further, in the sea-island structure, the cured object of the second shaping ink preferably forms islands.

When the cured object of the second shaping ink forms islands, the preferred conditions of the arithmetic average value of area of the islands, the thickness of the islands, and the width of islands are the same as the preferred conditions of the arithmetic average value of area of the islands, the thickness of the islands, and the width of islands when the cured object of the second shaping ink forms islands in the first three-dimensional shaped article.

In the exemplary embodiment, in a sectional view parallel to the shaped surface, for example, an arrangement pattern is a lattice pattern in which the first shaping ink and the second shaping ink are alternately arranged. In this case, the first shaping ink and the second shaping ink are preferably uniformly arranged. The size of the first shaping ink corresponding to one lattice may be the minimum unit which can be ejected from a first shaping ink head or may be a certain degree of size. Also, all shapes of the first shaping ink may not be the same. The same is true for the second shaping ink. The arrangement pattern may be a gradation arrangement pattern of the first shaping ink and the second shaping ink. Further, the arrangement pattern may be a random arrangement pattern of the first shaping ink and the second shaping ink.

When the arrangement pattern of the first shaping ink and the second shaping ink is the lattice arrangement pattern, the arrangement pattern in each layer is preferably set so that the first shaping ink and the second shaping ink are alternately arranged also in the height direction (lamination direction). When the arrangement pattern of the first shaping ink and the second shaping ink is the gradation arrangement pattern or the random arrangement pattern, the arrangement pattern in each layer is preferably set so that each of the first shaping ink and the second shaping ink is continued as little as possible in the height direction.

In the shaping, a support part may be formed by using a support part-forming ink. A support part-forming ink known in the 3D printer field can be used as the support part-forming ink without limitation.

For example, when there is a so-called overhanging portion in which the width of the shaped part at an upper position is larger than the width of the shaped part at a lower positon, the support part is preferably formed so as to support the overhanding portion from below.

In the shaping, the support part is preferably formed by using the second shaping ink as the support part-forming ink. That is, both a portion of the shaped part and the support part preferably contain the cured object of the second shaping ink.

In the shaping, the first three-dimensional shaped article is produced.

The first shaping ink described above for the first three-dimensional shaped article according to the exemplary embodiment is preferably used as the first shaping ink in the shaping. In addition, the second shaping ink described above for the first three-dimensional shaped article according to the exemplary embodiment is preferably used as the second shaping ink in the shaping.

A method for ejecting the first shaping ink and the second shaping ink in the shaping is not particularly limited, but ejection of an inkjet system is preferred, and ejection using an inkjet head is more preferred.

The inkjet head is not particularly limited, and a known inkjet head is used. For example, a piezo inkjet head is used.

The number of inkjet heads and the number of nozzles in the inkjet head are not particularly limited and may be properly determined.

The ejection temperature of each of the first shaping ink and the second shaping ink is not particularly limited and may be adjusted according to the first shaping ink and second shaping ink used.

Also, the ejection amount of each of the first shaping ink and the second shaping ink is not particularly limited as long as the content of the second shaping ink is within the range described above, and the ejection amount may be adjusted so as to achieve a target thickness. If required, the ejection may be performed plural times.

<Irradiation>

The method for producing the three-dimensional shaped article according to the exemplary embodiment preferably includes irradiating, with light, the first shaping ink and second shaping ink ejected.

The cured object of the first shaping ink and the cured object of the second shaping ink are produced by irradiation with light.

In the exemplary embodiment, the term "light" includes not only visible light but also ultraviolet light and infrared light unless otherwise specified.

In the irradiation, irradiation with ultraviolet light is preferred.

Also, the shaped part and the support part may be cured simultaneously or separately.

A light irradiating unit used in the irradiation is not particularly limited, and a known one is used. In particular, an ultraviolet irradiating device and an electron beam irradiating device are preferred, and the ultraviolet irradiating device is more preferred.

Examples of the ultraviolet (UV) irradiating device include, but are not limited to, a light-emitting diode (UV-LED), a high-pressure mercury lamp, a super high-pressure mercury lamp, a deep ultraviolet lamp, a lamp using microwaves for exciting a mercury lamp from the outside without an electrode, an ultraviolet laser, a xenon lamp, a metal halide lamp, and the like.

These light irradiating units may be used alone or in combination or two or more.

A light irradiating part which cures the support part and a light irradiating part which cures the shaped part may be the same or different.

A layer which forms the shaped part and a layer which forms the support part are laminated by repeating the shaping and the irradiation, thereby producing the first three-dimensional shaped article.

<Removal)

The method for producing the three-dimensional shaped article according to the exemplary embodiment preferably includes removing the support part by using physiological saline.

The temperature of physiological saline is preferably 60° C. or more and 90° C. or less, more preferably 65° C. or more and 85° C. or less, and particularly preferably 70° C. or more and 80° C. or less.

The removal is preferably performed after the completion of shaping and irradiation.

Examples of a removal method include, but are not particularly limited to, a method of impregnating the three-dimensional shaped article in physiological saline, a method of spraying physiological saline on the three-dimensional shaped article, and the like.

The removal allows physiological saline to enter the region including the cured object of the second shaping ink, thereby producing the second three-dimensional shaped article.

The method for producing the three-dimensional shaped article according to the exemplary embodiment is described in detail below with reference to the drawings.

FIG. 1 is a schematic configuration diagram showing an example of a three-dimensional shaping apparatus preferably used in the method for producing the three-dimensional shaped article according to the exemplary embodiment.

A three-dimensional shaping apparatus 101 is a three-dimensional shaping apparatus of an inkjet system. As shown in FIG. 1, the three-dimensional shaping apparatus 101 includes, for example, a shaping unit 10 and a shaping table 20. The three-dimensional shaping apparatus 101 also includes a first shaping ink cartridge 30 which houses the first shaping ink and a second shaping ink cartridge 32 which houses the second shaping ink, the cartridges 30 and 32 being detachable from the apparatus 101. In FIG. 1, MD denotes a three-dimensional shaped article, and SP denotes a support part. Although not shown in FIG. 1, the three-dimensional shaped article MD contains the cured object of the first shaping ink and the cured object of the second shaping ink. Also, an arrow A denotes a lamination direction.

Figure 2:
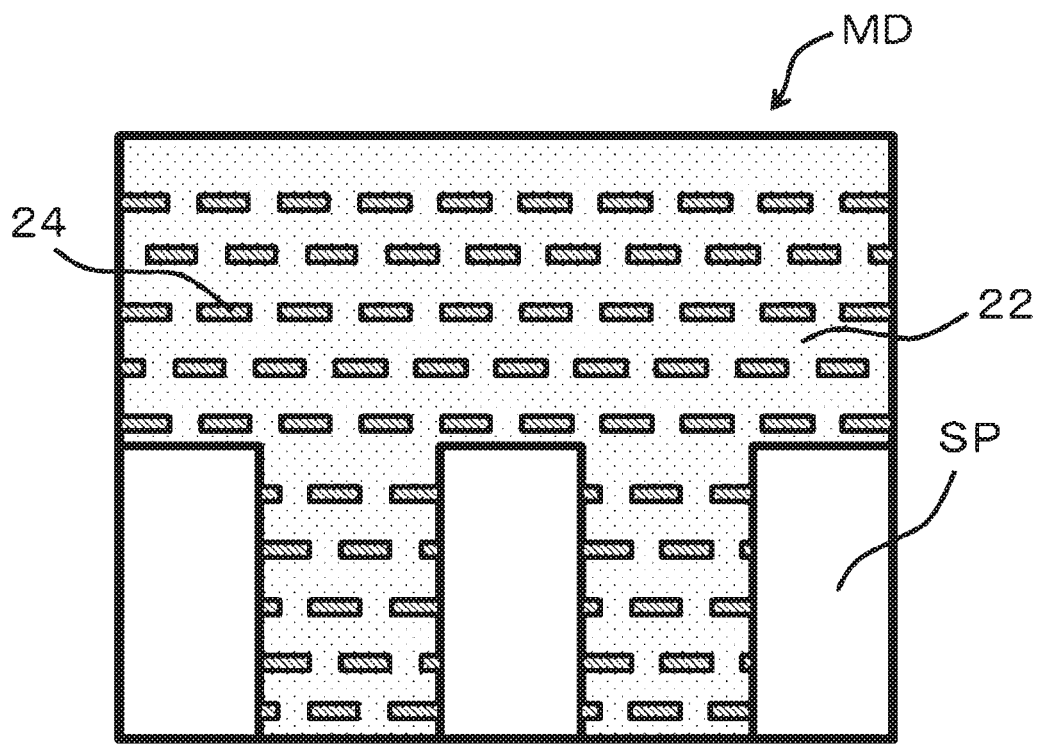
FIG. 2 is a sectional view in a direction perpendicular to the lamination direction of a three-dimensional shaped article MD shown in FIG. 1.

FIG. 2 is a sectional view in a direction perpendicular to the lamination direction of the three-dimensional shaped article MD shown in FIG. 1. As shown in FIG. 2, the three-dimensional shaped article MD contains a region 22 including the cured object of the first shaping ink and a region 24 including the cured object of the second shaping ink.

In FIG. 1, the shaping unit 10 includes a first shaping ink ejection head 12 which ejects droplets of the first shaping ink, a second shaping ink ejection head 14 (an example of a second ejection part) which ejects droplets of the second shaping ink, and a light irradiating device 16 which irradiates with light. In addition, although not shown in the drawings, the shaping unit 10 may further include, for example, a rotating roller which flattens the first shaping ink and second shaping ink ejected on the shaping table 20 by removing the excessive first shaping ink and second shaping ink.

The shaping unit 10 is, for example, of a type (so-called carriage type) in which it can be moved on a shaping region of the shaping table 20 in a main scanning direction and a sub-scanning direction crossing (for example, perpendicular to) the main scanning direction by a drive device (not shown).

An ejection head of a piezo system (piezoelectric system) which ejects, under pressure, droplets of each of the first shaping ink and the second shaping ink is applied as the first shaping ink ejection head 12 and the second shaping ink ejection head 14. Each of the ejection heads is not limited to this and may be an ejection head type in which each ink is ejected by the pressure of a pump.

The first shaping ink ejection head 12 is connected to, for example, the first shaping ink cartridge 30 through a supply tube (not shown). The first shaping ink is supplied to the first shaping ink ejection head 12 from the first shaping ink cartridge 30.

The second shaping ink ejection head 14 is connected to, for example, the second shaping ink cartridge 32 through a supply tube (not shown). The second shaping ink is supplied to the second shaping ink ejection head 14 from the second shaping ink cartridge 32.

Each of the first shaping ink ejection head 12 and the second shaping ink ejection head 14 is a short ejection head in which the effective ejection region (a region where ejection nozzles of the first shaping ink and the second shaping ink are arranged) is smaller than the shaping region of the shaping table 20.

Each of the first shaping ink ejection head 12 and the second shaping ink ejection head 14 may be a long ejection head in which the effective ejection region (a region where ejection nozzles of the first shaping ink and the second shaping ink are arranged) is equal to or larger than the width of the shaping region of the shaping table 20 (the length in a direction crossing (for example, perpendicular to) the movement direction (main scanning direction) of the shaping unit 10). In this case, the shaping unit 10 is a type in which it is moved only in the main scanning direction.

The light irradiating device 16 is selected according to the types of the first shaping ink and the second shaping ink. The light irradiating device 16 is, for example, an ultraviolet irradiating device or the like. Examples of the ultraviolet irradiating device include those described above.

The shaping table 20 can be move up and down by a drive device (not shown).

Next, the operation (method for producing the three-dimensional shaped article) of the three-dimensional shaping apparatus 101 according to the exemplary embodiment is described.

First, two-dimensional shape data (slice data), for example, forming a layer of the shaped part is formed as three-dimensional shaping data from the three-dimensional CAD (Computer Aided Design) data of the shaped part. In this case, the data is formed so as to perform ink ejection so that the content of the second shaping ink is 10% by mass or more and 40% by mass or less relative to the total mass of the shaped part. Also, the data is formed so as to form a sea-island structure including the cured object of the first shaping ink and the cured object of the second shaping ink.

When a support part is formed in the shaping, two-dimensional shape data (slice data) is also formed for forming the support part using the support part-forming ink (preferably, the second shaping ink).

Next, based on the two-dimensional shape data for forming the shaped part, the first shaping ink and the second shaping ink are ejected from the first shaping ink ejection head 12 and the second shaping ink ejection head 14, respectively, while moving the shaping unit 10, thereby forming a layer containing the first shaping ink and the second shaping ink on the shaping table 20. In this case, the content of the second shaping ink is adjusted to be 10% by mass or more and 40% by mass or less relative to the total mass of the shaped part. Then, the first shaping ink and the second shaping ink are cured by irradiating, with light, the layer containing the first shaping ink and the second shaping ink by using the light irradiating device 16, thereby forming a layer as a portion of the shaped part.

If required, based on the two-dimensional shape data for forming the support part, the second shaping ink is ejected from the second shaping ink ejection head 14 while moving the shaping unit 10, thereby forming a layer of the second shaping ink adjacent to the layer containing the first shaping ink and the second shaping ink. Then, the second shaping ink is cured by irradiating, with light, the layer of the second shaping ink by using the light irradiating device 16, thereby forming a layer as a portion of the support part.

The ink used for forming the support part is preferably the second shaping ink, but a known support part-forming ink may be used.

Figure 3:
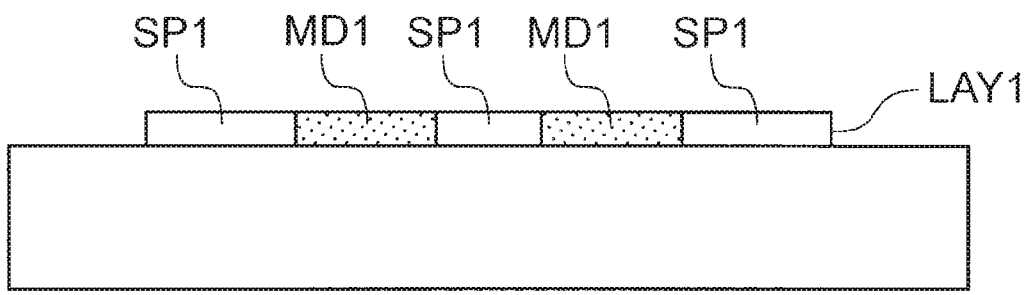
FIG. 3 is a process drawing showing an example of a method for producing a three-dimensional shaped article according to an exemplary embodiment of the present invention.

Therefore, a first layer LAY1 including the layer serving as a portion of the shaped part and the layer serving as a portion of the support part is formed (refer to FIG. 3). In FIG. 3, MD1 denotes the layer serving as a portion of the shaped part in the first layer LAY1, and SP1 denotes the layer serving as a portion of the support part in the first layer LAY1. Although not shown in the drawing, MD1 is the layer containing the first shaping ink and the second shaping ink.

Next, the shaping table 20 is moved down. The shaping table 20 is lowered by an amount corresponding to the thickness of a second layer to be formed next (second layer including a layer serving as a portion of the shaped part and, if required, a layer serving as a portion of the support layer).

Figure 4:
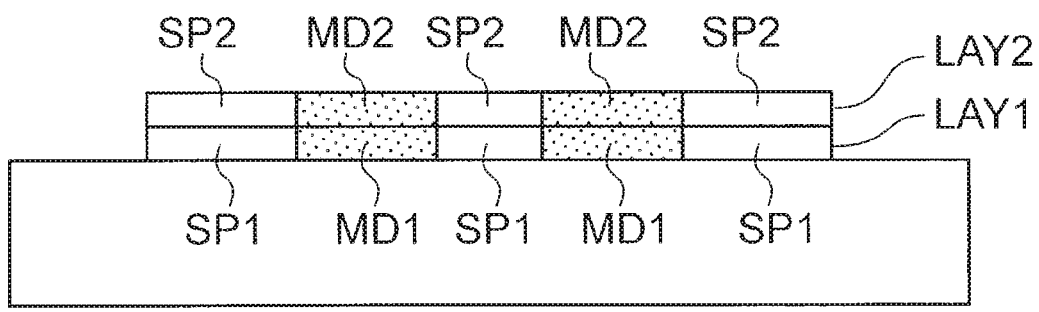
FIG. 4 is a process drawing showing an example of a method for producing a three-dimensional shaped article according to an exemplary embodiment of the present invention.

Next, the second layer LAY2 including a layer serving as a portion of the shaped part and, if required, a layer serving as a portion of the support layer is formed in the same manner as the first layer LAY1 (refer to FIG. 4). In FIG. 4, MD2 denotes the layer serving as a portion of the shaped part in the second layer LAY2, and SP2 denotes the layer serving as a portion of the support part in the second layer LAY2. Although not shown in the drawing, MD2 is the layer containing the first shaping ink and the second shaping ink.

Figure 5:
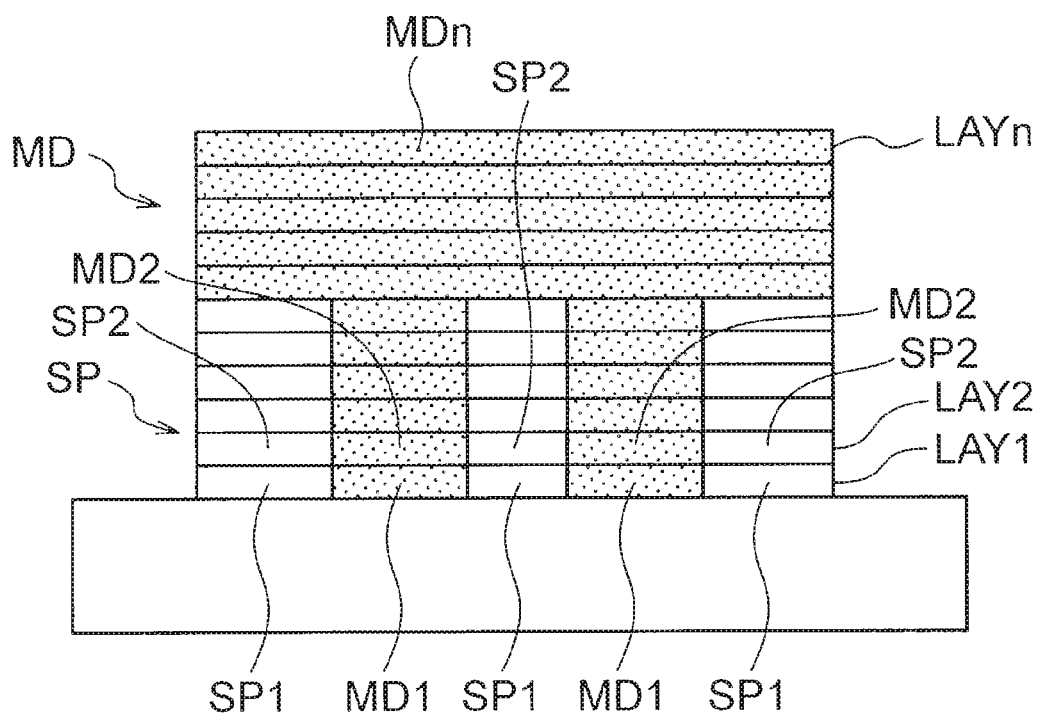
FIG. 5 is a process drawing showing an example of a method for producing a three-dimensional shaped article according to an exemplary embodiment of the present invention.

The operation of forming the first layer LAY1 and the second layer LAY2 is repeated to form up to an nth layer LAYn. Therefore, the shaped article at least partially supported by the support part is formed (refer to FIG. 5). In FIG. 5, MDn denotes the layer serving as a portion of the shaped part in the nth layer LAYn. In addition, MD denotes the shaped part, and SP denotes the support part.

Then, the support part is removed from the shaped part, thereby producing an intended three-dimensional shaped article (the second three-dimensional shaped article according to the exemplary embodiment of the invention). As described above, the support part is preferably removed by using physiological saline at 60° C. to 90° C.

EXAMPLES

The exemplary embodiments of the present invention are described below by giving examples, but the exemplary embodiments are not limited to these examples. In a description below, "parts" and "%" are on a mass basis unless otherwise specified.

<Preparation of Second Shaping Ink 1>

Water-Soluble Monomer: HEAA (Manufactured by KJ Chemicals Corporation), 28.5 parts by mass Alkyl ester compound of unsaturated fatty acid having a hydroxyl group: URIC H31 (manufactured by Itoh Oil Chemicals Co., Ltd.) methyl ricinoleate, 52.5 parts by mass Compatibilizer: MTG (manufactured by Nippon Nyukazai Co., Ltd.), 17.5 parts by mass Polymerization initiator: IRGACURE 819 (manufactured by BASF Corporation), 1 part by mass Polymerization inhibitor: MEHQ, 0.2 parts by mass Surfactant: TEGO Wet 270 (manufactured by Evonik Co., Ltd.), 0.3 parts by mass A second shaping ink 1 is prepared by mixing the components described above.

<Preparation of Second Shaping Ink 2>

Water-soluble monomer: HEAA (manufactured by KJ Chemicals Corporation), 33.5 parts by mass Compatibilizer: MTG (manufactured by Nippon Nyukazai Co., Ltd.), 65 parts by mass Polymerization initiator: IRGACURE 819 (manufactured by BASF Corporation), 1 part by mass Polymerization inhibitor: MEHQ, 0.2 parts by mass Surfactant: TEGO Wet 270 (manufactured by Evonik Co., Ltd.), 0.3 parts by mass A second shaping ink 2 is prepared by mixing the components described above.

<Preparation of Second Shaping Ink 3>

Water-soluble monomer: BLEMMER GLM (manufactured by NOF Corporation: glycerin monomethacrylate), 35.5 parts by mass Alkyl ester compound of unsaturated fatty acid having a hydroxyl group: URIC H31 (manufactured by Itoh Oil Chemicals Co., Ltd.) methyl recinoleate, 45.5 parts by mass Compatibilizer: MTG (manufactured by Nippon Nyukazai Co., Ltd.), 17.5 parts by mass Polymerization initiator: IRGACURE 819 (manufactured by BASF Corporation), 1 part by mass Polymerization inhibitor: MEHQ, 0.2 parts by mass Surfactant: TEGO Wet 270 (manufactured by Evonik Co., Ltd.), 0.3 parts by mass A second shaping ink 3 is prepared by mixing the components described above.

<Preparation of First Shaping Ink 1>

Urethane acrylate oligomer: 12.7 parts by mass ("U-200PA" manufactured by Shin-Nakamura Chemical Co., Ltd.)

Urethane acrylate oligomer: 16.4 parts by mass ("UA-4200" manufactured by Shin-Nakamura Chemical Co., Ltd.)

Acrylate monomer: 50.9 parts by mass ("VEEA" manufactured by Nippon Shokubai Co., Ltd., 2-(2-vinyloxyethoxy) ethyl acrylate)

Acrylate monomer: 15.1 parts by mass ("IBXA" manufactured by Osaka Organic Chemical Industry Ltd.), isobornyl acrylate)

Polymerization inhibitor: 0.5 parts by mass (MEHQ (hydroquinone monomethyl ether))

Polymerization initiator: 3.0 parts by mass (LUCIRIN TPO manufactured by BASF Corporation, 2,4,6-trimethylbenzoyl diphenylphosphine oxide)

Polymerization initiator: 1.0 parts by mass (IRGACURE 379 manufactured by BASF Corporation, 2-dimethylamino-2-(4-methylbenzyl)-1-(4-morpholin-4-yl-phenyl)-butan-1-one)

Sensitizer: 1.0 parts by mass (ITX (2-isopropylthioxanthone))

Surfactant: 0.2 parts by mass (TEGO Wet 270 manufactured by Evonik Co., Ltd., polyether-modified siloxane copolymer)

A first shaping ink 1 is prepared by mixing the components described above.

<Preparation of First Shaping Ink 2>

Urethane acrylate oligomer: 29.00 parts by mass ("UA-4200" manufactured by Shin-Nakamura Chemical Co., Ltd.)

Acrylate monomer: 50.90 parts by mass ("VEEA" manufactured by Nippon Shokubai Co., Ltd., 2-(2-vinyloxyethoxy) ethyl acrylate)

Acrylate monomer: 15.20 parts by mass ("DIACETONE ACRYLAMIDE" manufactured by Nihon Kasei Co., Ltd.)

Polymerization inhibitor: 0.50 parts by mass (MEHQ (hydroquinone monomethyl ether))

Polymerization initiator: 3.00 parts by mass (LUCIRIN TPO manufactured by BASF Corporation, 2,4,6-trimethylbenzoyl diphenylphosphine oxide)

Polymerization initiator: 1.00 parts by mass ("IRGACURE 379" manufactured by BASF Corporation, 2-dimethylamino-2-(4-methylbenzyl)-1-(4-morpholin-4-yl-phenyl)-butan-1-one)

Sensitizer: 1.00 parts by mass (ITX (2-isopropyl thioxanthone))

Surfactant: 0.20 parts by mass ("TEGO Wet 270" manufactured by Evonik Co., Ltd., polyether-modified siloxane copolymer)

A first shaping ink 2 is prepared by mixing the components described above.

Example 1

<Formation of Three-Dimensional Shaped Article>

The three-dimensional shaping apparatus used as a shaping apparatus for test includes a drive part and a controller, and POLARIS HEAD (model No. PQ512/85) manufactured by Fujifilm Dimatix, Inc., which is selected as an inkjet head, and SUBZERO-055 (strength 100 w/cm) manufactured by INTERGATION TECHNOLOGY LTD., which is selected as an ultraviolet irradiation light source are installed in the shaping device. The shaping apparatus uses a system in which both the inkjet head and the light source are reciprocated. In the apparatus, at each time of scanning, a shaped part having a thickness of 20 µm and, if required, a support part is laminated and cured by ultraviolet irradiation, thereby forming a three-dimensional shaped article and, if required, a support part of the second shaping ink. The shaping apparatus has a mechanism in which the first shaping ink and the second shaping ink are fed to the inkjet head after foreign materials are removed by passing through PROFILE STAR A050 filer (filtration precision 5 µm) manufactured by Nihon Pall Ltd. from a storage tank through a chemical resistant tube, TYGON 2375 manufactured by Saint-Gobain Co., Ltd. using a feed pump under light-shielding conditions.

A three-dimensional shaped article having a hemispherical dome-like shape with a diameter of 2 cm is formed by the shaping apparatus using the second shaping ink and the first shaping ink shown in Table 1.

The content of the second shaping ink relative to the total mass of the shaped part is 40% by mass.

Then, the support part is removed by continuously spraying physiological saline of 75° C. using a pump, forming a three-dimensional shaped article.

<Evaluation of Cuttability with Electric Knife>

Cutting with an electric knife is performed by using the three-dimensional shaped article after the removal of the support part. DIATERMO MB122 manufactured by GIMA Co., Ltd. is used as the electric knife.

The shaped article is mounted on a counter electrode so that the lower surface of the dome is in contact with the counter electrode, and cutting is attempted by using the electric knife in a monopolar mode. Cutting is first attempted at 200 W, and cutting is again attempted at 100 W with respect to the shaped article which can be cut.

Evaluation criteria are shown below.

A: Cutting is possible without any problem.

B: Cutting is possible with a slight resistance.

C: Cutting has a problem of taking time or cutting is impossible.

The criteria up to B are regarded as being in an allowable range.

Examples 2 to 14 and Comparative Example 1

Evaluation is made by changing the types and amount ratios of the first shaping ink and the second shaping ink. The results are shown in Table 1. The shaped articles of Example 9 and Example 13 are in a state of being easily broken during cutting in spite of having hardness. The shaped article of Comparative Example 1 is difficult to cut and is thus not further evaluated.

Further, shaping is attempted by using only the second ink. However, evaluation is not made because of the excessively low strength of the shaped article.

TABLE 1

|  | Example 1 | Example 2 | Example 3 | Example 4 | Example 5 | Example 6 | Example 7 | Example 8 |
|---|---|---|---|---|---|---|---|---|
| First ink | 1 | 1 | 1 | 2 | 2 | 2 | 1 | 1 |
| Second ink | 1 | 2 | 3 | 1 | 2 | 3 | 1 | 1 |
| Content of second ink (%) | 40 | 40 | 40 | 40 | 40 | 40 | 25 | 30 |
| Area ratio (% by area) | 38 | 35 | 40 | 40 | 38 | 40 | 22 | 28 |
| Arithmetic average of area ($10^{-13}$ m$^2$) | 6.8 | 5 | 7.3 | 7 | 5.5 | 7.7 | 2.7 | 3.3 |
| Volume resistivity (Ω·cm) | 730 | 550 | 680 | 650 | 500 | 600 | 850 | 750 |
| JIS-A (°) | 25 | 20 | 23 | 20 | 15 | 18 | 35 | 29 |
| Cuttability (200 W) | A | A | A | A | A | A | B | A |
| Cuttability (100 W) | A | A | B | A | A | B | B | A |

|  | Example 9 | Example 10 | Example 11 | Example 12 | Example 13 | Example 14 | Comparative Example 1 |
|---|---|---|---|---|---|---|---|
| First ink | 1 | 1 | 1 | 1 | 1 | 1 | 1 |
| Second ink | 1 | 1 | 3 | 3 | 3 | 3 | No |
| Content of second ink (%) | 48 | 45 | 25 | 30 | 48 | 45 | 0 |
| Area ratio (% by area) | 52 | 44 | 23 | 30 | 51 | 44 | — |
| Arithmetic average of area ($10^{-13}$ m$^2$) | 11 | 8.3 | 2.9 | 3.7 | 11.6 | 9.4 | — |
| Volume resistivity (Ω·cm) | 400 | 460 | 900 | 650 | 440 | 580 | — |
| JIS-A (°) | 9 | 15 | 38 | 30 | 6 | 11 | — |
| Cuttability (200 W) | A | A | B | A | A | A | C |
| Cuttability (100 W) | A | A | B | B | B | B | C |

In Table 1, a numerical value in the column "Area ratio (area %)" indicates the area ratio (area %) of the cured object of the second shaping ink relative to the total area of a section in a direction perpendicular to the lamination direction of the three-dimensional shaped article before the support part is removed by using physiological saline.

A numerical value in the column "Arithmetic average of area (m$^2$)" indicates the arithmetic average of area (m$^2$) of islands formed by the second shaping ink in the section before the support part is removed by physiological saline.

A numerical value in the column "Volume resistivity (Ω·cm)" indicates the volume resistivity (Ω·cm) of the three-dimensional shaped article after the support part is removed by physiological saline.

A numerical value in the column "JIS-A hardness)(°)" indicates the JIS-A hardness)(°) of the three-dimensional shaped article after the support part is removed by physiological saline.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A three-dimensional shaped article having a sea-island structure comprising:
    a cured object of a first shaping ink, which contains a hydrophobic resin; and
    a cured object of a second shaping ink, which contains a hydrophilic resin,
    wherein an area ratio of the cured object of the second shaping ink relative to a total area of a section in a direction perpendicular to a lamination direction is 20% by area or more and less than 50% by area, and
    wherein in the section in a direction perpendicular to the lamination direction, the cured object of the second shaping ink forms an island in the sea-island structure.

2. The three-dimensional shaped article according to claim 1, wherein the hydrophilic resin has a constituent unit composed of N-hydroxyethyl acrylamide.

3. The three-dimensional shaped article according to claim 1, wherein the cured object of the second shaping ink further contains an ester compound of an unsaturated fatty acid having a hydroxyl group.

4. The three-dimensional shaped article according to claim 3, wherein the ester compound of an unsaturated fatty acid having a hydroxyl group is hydroxyl group-modified castor oil.

5. The three-dimensional shaped article according to claim 1, wherein an arithmetic average value of area of the islands in the section in a direction perpendicular to the lamination direction is $1 \times 10^{-13}$ m$^2$ or more and less than $1 \times 10^{-12}$ m$^2$.

6. A three-dimensional shaped article having a sea-island structure comprising:
   a cured object of a first shaping ink, which contains a hydrophobic resin; and
   a cured object of a second shaping ink, which contains a hydrophilic resin,
   wherein the cured object of the second shaping ink is at least partially exposed in the surface.

7. The three-dimensional shaped article according to claim 1, further comprising
   a region containing physiological saline.

8. The three-dimensional shaped article according to claim 7, wherein an area ratio of region containing physiological saline relative to a total area of a section in a direction perpendicular to a lamination direction is 20% by area or more and less than 50% by area.

9. The three-dimensional shaped article according to claim 8, wherein in the section in a direction perpendicular to the lamination direction, the region containing physiological saline forms an island in the sea-island structure.

10. The three-dimensional shaped article according to claim 9, wherein the arithmetic average value of area of the islands in the section in a direction perpendicular to the lamination direction is $1 \times 10^{-13}$ m$^2$ or more and less than $1 \times 10^{-12}$ m$^2$.

11. A method for producing the three-dimensional shaped article according to claim 1, the method comprising:
    shaping to form a shaped part by ejecting the first shaping ink containing a precursor of the hydrophobic resin and a second shaping ink containing a precursor of the hydrophilic resin so that a content of the second shaping ink relative to a total mass of the shaped part is 20% by mass or more and less than 50% by mass.

12. The method for producing a three-dimensional shaped article, according to claim 11, wherein in the shaping, a support part is formed by using the second shaping ink.

13. The method for producing a three-dimensional shaped article, according to claim 12, further comprising removing the support part by using physiological saline.

14. The three-dimensional shaped article according to claim 1, wherein the cured object of the second shaping ink is at least partially exposed in the surface.

15. The three-dimensional shaped article according to claim 6, further comprising a region containing physiological saline.

16. The three-dimensional shaped article according to claim 1, wherein the second shaping ink contains a water-soluble monomer, the water-soluble monomer includes a monomer having a hydroxyl group, and the second shaping ink contains the monomer having a hydroxyl group in an amount of 50% by mass or more relative to a total mass of the water-soluble monomer.

17. The three-dimensional shaped article according to claim 16, wherein the second shaping ink contains the monomer having a hydroxyl group in the amount of 80% by mass or more relative to the total mass of the water-soluble monomer.

18. The three-dimensional shaped article according to claim 16, wherein the content of the water-soluble monomer in the second shaping ink is 70% by mass or more and 95% by mass or less relative to the total mass of the second shaping ink.

* * * * *